(12) United States Patent
Zhang et al.

(10) Patent No.: US 10,310,649 B2
(45) Date of Patent: Jun. 4, 2019

(54) EMBEDDED TOUCH PANELS AND THE ARRAY SUBSTRATES THEREOF

(71) Applicant: Wuhan China Star Optoelectronics Technology Co., Ltd., Wuhan, Hubei (CN)

(72) Inventors: Qipei Zhang, Guangdong (CN); Chunqian Zhang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/502,789

(22) PCT Filed: Dec. 30, 2016

(86) PCT No.: PCT/CN2016/113740
§ 371 (c)(1),
(2) Date: Feb. 9, 2017

(87) PCT Pub. No.: WO2018/120122
PCT Pub. Date: Jul. 5, 2018

(65) Prior Publication Data
US 2018/0210587 A1 Jul. 26, 2018

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS

| 2015/0331530 A1 | 11/2015 | Kim | |
| 2017/0207306 A1* | 7/2017 | Otremba | H01L 29/1608 |
| 2018/0067582 A1* | 3/2018 | Wang | G06F 3/044 |

FOREIGN PATENT DOCUMENTS

| CN | 101598862 A | 12/2009 |
| CN | 103268036 A | 8/2013 |

(Continued)

*Primary Examiner* — Kenneth B Lee, Jr.
(74) *Attorney, Agent, or Firm* — Andrew C. Cheng

(57) ABSTRACT

The present disclosure relates to an array substrate of embedded touch panels. The array substrate includes a touch electrode arranged in an active area of the touch panel in a matrix, a touch sensing chip arranged outside the active area of the touch panel, a plurality of metal connecting lines arranged on a different layer with the touch electrode. The metal connecting lines connect to the touch electrode via at least one through hole, and the metal connecting line and a data line of the touch panel are insulated from each other and are overlapped. The touch electrode connects to the touch sensing chip via the metal connecting line, wherein a switch circuit is arranged between the metal connecting line and the data line. The switch circuit connects the metal connecting line and the data line in a touch phase, and the switch circuit disconnects the metal connecting line and the data line in a display phase.

7 Claims, 3 Drawing Sheets

(51) Int. Cl.
   *G02F 1/1368* (2006.01)
   *G02F 1/1362* (2006.01)
   *G06F 3/044* (2006.01)
   *G02F 1/136* (2006.01)
   *G02F 1/1343* (2006.01)

(52) U.S. Cl.
   CPC ........ *G02F 1/136286* (2013.01); *G06F 3/044* (2013.01); *G02F 1/134363* (2013.01); *G02F 1/136209* (2013.01); *G02F 1/136227* (2013.01); *G02F 2001/13606* (2013.01); *G02F 2001/13685* (2013.01)

(56) References Cited

FOREIGN PATENT DOCUMENTS

| | | |
|---|---|---|
| CN | 103268178 A | 8/2013 |
| CN | 104503649 A | 4/2015 |
| CN | 104866158 A | 8/2015 |
| CN | 204856449 U | 12/2015 |
| CN | 105487717 A | 4/2016 |
| CN | 105528126 A | 4/2016 |
| CN | 105629546 A | 6/2016 |
| CN | 106201106 A | 12/2016 |

\* cited by examiner

EMBEDDED TOUCH PANELS AND THE ARRAY SUBSTRATES THEREOF

BACKGROUND OF THE INVENTION

1. Field of the Invention

The present disclosure relates to a touch panel, and more particularly to an embedded touch panel and the array substrate thereof.

2. Discussion of the Related Art

Liquid crystal display (LCDs) have been the most popular flat display, and are the high-resolution color displays being adopted by electronic devices, such as mobile phones, personal digital assistants (PDAs), digital cameras, desktop computers or laptop computers.

With the development of liquid crystal display technology, the display quality, design and human-machine interface of LCDs have been put forward higher requirements, and the touch technology has become the technical hotspot due to the convenient operations and highly integrated attribute.

With the rapid development of the touch technology, a great deal of touch panels have been put in mass production. Conventional touch panels may include on-cell, in-cell, and out-cell in accordance with the location of the touch sensor. In regard to the in-cell touch panel, the touch function is embedded into the liquid crystal pixels. Not only the thickness of the panel may be reduced, but also the LCD may be manufactured at the same time without introducing additional manufacturing process. In addition, the visibility may not be affected even under a bright environment. Thus, the in-cell touch panels have been very popular.

Currently, the embedded touch panel adopts a metal connecting layer to transmit touch signals, wherein the metal connecting layer includes a plurality of metal connecting lines parallel to each other so as to electrically connect welding electrodes of different touch sensors. The metal connecting lines are configured above the data lines of the touch panel such that the pixel aperture rate may not be affected. As such, the RC loading between the metal connecting line and the data line may exist. The RC loading may affect the precision of the touch signals transmitted by the metal connecting lines.

SUMMARY

The present disclosure relates to an array substrate of embedded touch panel for reducing a RC loading of the wirings within an effective area of the touch panel so as to enhance the touch precision of the touch panel.

In one aspect, an array substrate of embedded touch panels includes: a touch electrode is arranged in an active area of the touch panel in a matrix; a touch sensing chip arranged outside the active area of the touch panel; a plurality of metal connecting lines arranged on a different layer with the touch electrode, the metal connecting lines connect to the touch electrode via at least one through hole, and the metal connecting line and a data line of the touch panel are insulated from each other and are overlapped; wherein the touch electrode connects to the touch sensing chip via the metal connecting line; wherein a switch circuit is arranged between the metal connecting line and the data line, the switch circuit connects the metal connecting line and the data line in a touch phase, and the switch circuit disconnects the metal connecting line and the data line in a display phase.

Wherein the switch circuit includes at least one thin film transistor (TFT) and a common conductive line.

Wherein a gate of the TFT connects to the common conductive line, one of a source and a drain of the TFT connects to the metal connecting line, and the other one of the source and the drain of the TFT connects to the data line.

Wherein the common conductive line is lead out by the touch sensing chip.

Wherein the TFT is a NMOS, a PMOS, a CMOS, or a transmission gate.

Wherein the switch circuit is arranged at a top side or a bottom side of the active area of the touch panel.

In another aspect, an embedded touch panel includes: an array substrate includes: a touch electrode is arranged in an active area of the touch panel in a matrix; a touch sensing chip arranged outside the active area of the touch panel; a plurality of metal connecting lines arranged on a different layer with the touch electrode, the metal connecting lines connect to the touch electrode via at least one through hole, and the metal connecting line and a data line of the touch panel are insulated from each other and are overlapped; wherein the touch electrode connects to the touch sensing chip via the metal connecting line; wherein a switch circuit is arranged between the metal connecting line and the data line, the switch circuit connects the metal connecting line and the data line in a touch phase, and the switch circuit disconnects the metal connecting line and the data line in a display phase.

Wherein a gate of the TFT connects to the common conductive line, one of the source and the drain of the TFT connects to the metal connecting line, and the other one of the source and the drain of the TFT connects to the data line.

Wherein the common conductive line is lead out by the touch sensing chip.

Wherein the switch circuit is arranged at a top side or a bottom side of the active area of the touch panel.

In view of the above, in the touch phase, the touch sensing chip (IC) provides the signals to the common conductive line such that the TFT is turned on and the data line electrically connects to the metal connecting line. Thus, the resistance and the capacitance of the wirings in the active area (AA) of the touch panel may be greatly decreased. The RC loading is decreased, and the precision of the touch panel is enhanced.

DETAILED DESCRIPTION OF THE EMBODIMENTS

Figure 1:
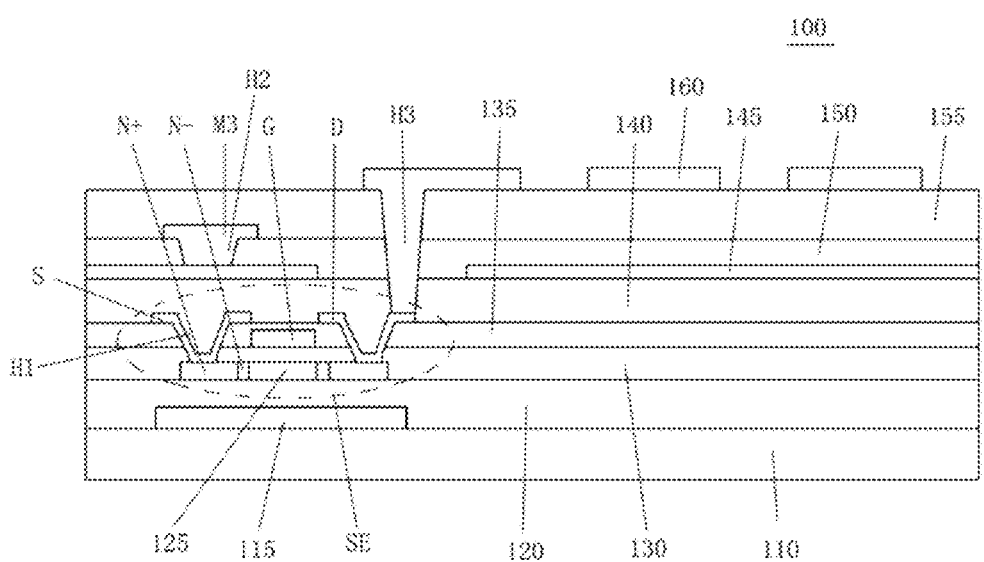
FIG. 1 is a cross sectional view of one conventional in-cell touch array substrate.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and or functions described in unnecessary detail. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

FIG. 1 is a cross sectional view of one conventional in-cell touch array substrate.

Referring to FIG. 1, the touch array substrate 100 includes a substrate 110, a masking layer 115, a buffering layer 120, a semiconductor component (SE), a planarization layer 140, a common electrode layer 145, a second inter-layer insulation layer 150, a metal connecting layer (M3), a passivation layer 155, and a pixel electrode layer 160.

The substrate 110 may include a transparent substrate, preferably, the substrate 110 is a glass substrate.

The masking layer 115 is arranged above the substrate 110 and below the semiconductor component (SE) to prevent light beams from entering the semiconductor component (SE), such as a trench area of thin film transistors (TFTs). In this way, the leakage current may be decreased, and the electronic performance of the TFTs may be enhanced. The masking layer 115 may include one of or a combination of Mo, Ti, Al, and Cu.

The buffering layer 120 is arranged above the substrate 110, and the buffering layer 120 covers the masking layer 115 of the substrate 110. The buffering layer 120 effectively prevents metallic atoms and/or impurity from diffusion from the substrate 110 toward other layers on the substrate 110, which enhances the flatness of the irregular surface of the substrate 110. The buffering layer 120 may be a $SiO_x$ layer, a $SiN_x$ layer, or a combination layer overlapped by the $SiO_x$ layer and the $SiN_x$ layer.

The semiconductor component (SE) is arranged on the buffering layer 120, and the semiconductor component (SE) may include TFTs, including a polysilicon layer 125, a source (S), a drain (D), a gate (G), and a gate insulation layer 130 and a first inter-layer insulation layer 135.

The polysilicon layer 125 is arranged above the buffering layer 120, and the polysilicon layer 125 includes a N-type heavy-doping area (N+), and a N-type light-doping area (N−) between the N-type heavy-doping area (N+) and the trench area (CH).

The gate insulation layer 130 is arranged on the buffering layer 120, and the gate insulation layer 130 covers the polysilicon layer 125. The gate insulation layer 130 may be a $SiO_x$ layer, a $SiN_x$ layer, or a combination layer overlapped by the $SiO_x$ layer and the $SiN_x$ layer.

The gate (G) is arranged above the gate insulation layer 130. The gate (G) is overlapped with the trench area (CH) of the polysilicon layer 125. The gate (G) may include metal, alloy, conductive metal oxide, and transparent conductive materials.

The first inter-layer insulation layer 135 is arranged above the gate insulation layer 130, and the first inter-layer insulation layer 135 covers the gate (G) on the gate insulation layer 130. The first inter-layer insulation layer 135 may be formed by inorganic materials or organic materials.

The source (S) and the drain (D) are arranged above the first inter-layer insulation layer 135. The source (S) and the drain (D) respectively contacts with the N-type heavy-doping area (N+) via at least one first through hole (H1). The first through holes (H1) are formed at two ends of the N-type heavy-doping area (N+), and the first through holes (H1) pass through the first inter-layer insulation layer 135 and the gate insulation layer 130. Each of the source (S) and the drain (D) may include a metal film, an alloy film, a metal nitride film, a conductive metal oxide film and/or a transparent conductive film.

The planarization layer 140 is arranged above the first inter-layer insulation layer 135. The planarization layer 140 completely covers the source (S) and the drain (D). The planarization layer 140 may include a substantially flat surface without steps surrounding the source (S) and the d. The planarization layer 140 may include organic or inorganic materials.

The common electrode layer 145 is arranged above the planarization layer 140. The common electrode layer 145 may be made by transparent metal oxide, including one or a plurality of indium tin oxide, indium zinc oxide, aluminum tin oxide, aluminum zinc oxide, and indium germanium zinc oxide.

The second inter-layer insulation layer 150 is arranged on the planarization layer 140, and the second inter-layer insulation layer 150 covers the common electrode layer 145 on the planarization layer 140. The second inter-layer insulation layer 150 may be a $SiO_x$ layer, a $SiN_x$ layer, or a combination layer overlapped by the $SiO_x$ layer and the $SiN_x$ layer.

The metal connecting layer (M3) is arranged above the second inter-layer insulation layer 150 and is overlapped with the source (S) of the semiconductor component (SE). The metal connecting layer (M3) contacts with the common electrode layer 145 below the metal connecting layer (M3) via at least one second through hole (H2). The second through hole (H2) are formed on the common electrode layer 145 and the second through hole (H2) pass through the second inter-layer insulation layer 150. The metal connecting layer (M3) may be made by conductive materials.

The passivation layer 155 is arranged on the second inter-layer insulation layer 150, and the passivation layer 155 covers the metal connecting layer (M3) on the second inter-layer insulation layer 150. The passivation layer 155 may be made by silicon nitride or silica.

The pixel electrode layer 160 is arranged on the passivation layer 155. The pixel electrode layer 160 contacts with the drain (D) of the semiconductor component (SE) via a third through hole (H3). The third through hole (H3) is arranged on the drain (D) of the semiconductor component (SE) and the third through hole (H3) passes through the planarization layer 140, the second inter-layer insulation layer 150, and the passivation layer 155. The pixel electrode layer 160 may be made by transparent metal oxide, including one or a plurality of indium tin oxide, indium zinc oxide, aluminum tin oxide, aluminum zinc oxide, and indium germanium zinc oxide.

The source (S) of the semiconductor component (SE) connects to the data line, and the gate (G) of the semiconductor component (SE) connects to the gate line. The display panel is driven by the gate signals provided by the gate line and the data voltage provided by the data line.

As the metal connecting layer (M3) of the touch panel is overlapped with the data line, the RC loading exists between the metal connecting layer (M3) and the data line. The RC loading directly affect the precision of the touch signals transmitted by the metal connecting layer, which also causes the touch precision of the panel to be downgraded.

The above embedded touch array substrate realizes the touch function by the configuration of the common electrode layer 145 and the metal connecting layer (M3). The touch technology is of the in-cell type, wherein the common electrode layer 145 operates as the in-cell electrode of the touch panel.

Figure 2:
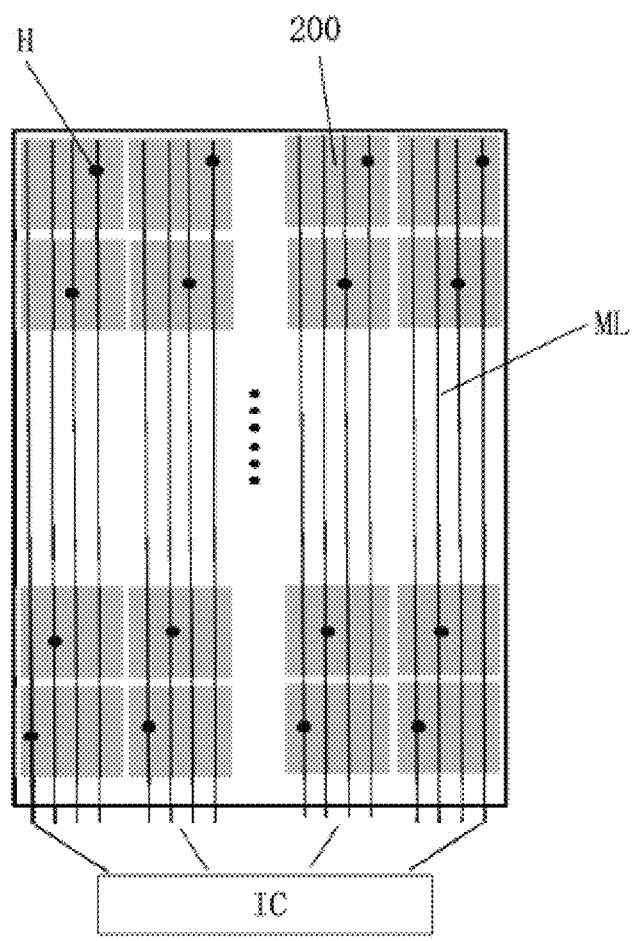
FIG. 2 is a schematic view of one conventional in-cell touch array substrate.

FIG. 2 is a schematic view of one conventional in-cell touch array substrate.

As shown in FIG. 2, the in-cell touch array substrate includes a touch sensing chip (IC), a plurality of metal connecting lines (ML) connecting to the touch sensing chip (IC), and a plurality of self-capacitive electrode 200. The metal connecting lines (ML) are parallel to each other, wherein the touch sensing chip (IC) is arranged outside of the active area of the touch panel. The self-capacitive electrodes 200 is arranged within the active area of the touch panel in a matrix. Each of the metal connecting lines (ML) is configured to electrically connect the corresponding touch sensing chip (IC) and the self-capacitive electrodes 200.

The self-capacitive electrodes 200 corresponds to the common electrode layer 145 in FIG. 1, and the metal connecting lines (ML) corresponds to the metal connecting layer (M3) in FIG. 1. The self-capacitive electrodes 200 and the metal connecting lines (ML) are arranged on different layers, and the self-capacitive electrodes 200 electrically connects to the corresponding metal connecting lines (ML) via the through hole (H), wherein the through hole (H) corresponds to the second through hole (H2) electrically connecting the metal connecting layer (M3) and the common electrode layer 145.

The common electrode layer 145 below the metal connecting layer (M3) in FIG. 3, which operates as the self-capacitive electrode, may be of a hollow design such that the self-capacitive electrodes 200 are spaced apart from each other, as shown in FIG. 2, so as to enhance the crosstalk between the self-capacitive electrodes 200.

When the panel has not been touched, the capacitance of each of the self-capacitive electrodes is a fixed amount. When the panel is touched, the fixed amount is overlapped with the human body's capacitance. The touch sensing chip detects the touch location by detecting the change of the self-capacitive electrode in the touch phase.

To reduce the interference between the display signals and the touch signals, the image quality and the touch precision of the images are enhanced, wherein the touch and the display phases are driven in different time slots. In the touch phase, the touch panel generates the driving signals and receives the sensing signals to determine the touch location. In the display phase, the touch panel generates the common voltage, and the touch panel connects to the common electrode layer via the through hole, wherein the common electrode layer is below the touch panel. In this way, the LCD performs the display normally.

Figure 3:
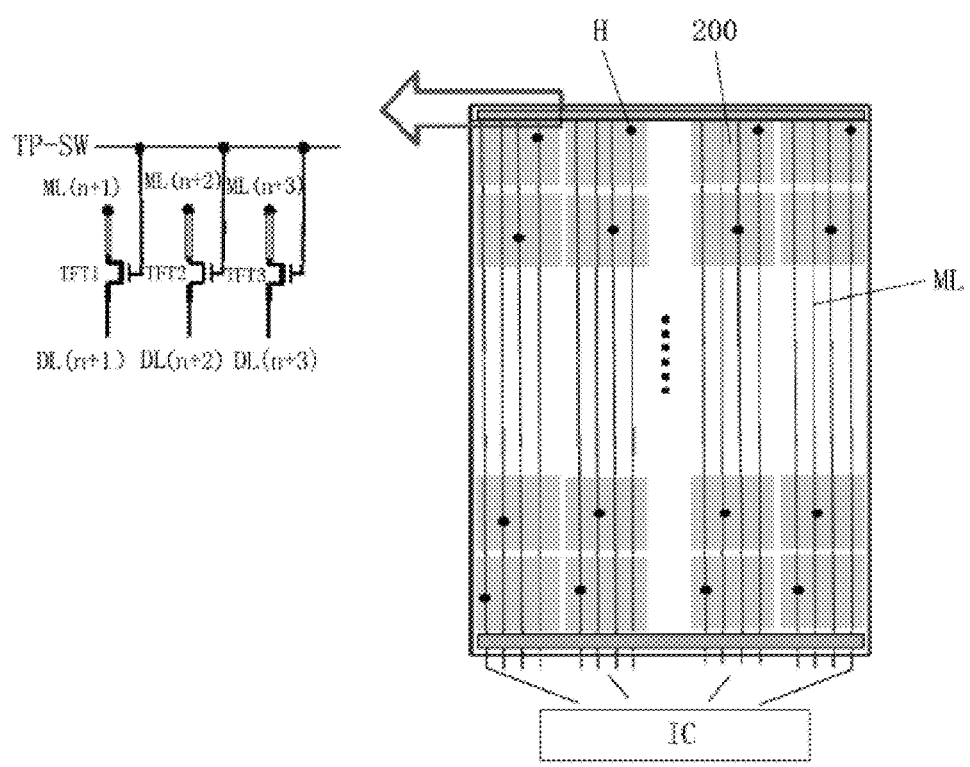
FIG. 3 is a schematic view of the in-cell touch array substrate in accordance with one embodiment.

FIG. 3 is a schematic view of the in-cell touch array substrate in accordance with one embodiment.

To overcome the above-mentioned shortcomings, a switch circuit (TP-SW) including a set of TFTs and a common conductive line (TP-SW) is arranged in a rim of the active area (AA) of the touch panel, wherein the switch circuit is configured for connecting or disconnecting the metal connecting lines (ML) and the data line.

The number of the TFTs is the same with the number of the metal connecting lines (ML). In an example, referring to FIG. 3, the switch circuit includes three TFTs, wherein one of the source and the drain of the TFT connects to the corresponding metal connecting lines (ML), the other one of the source and the drain connects to the corresponding data line. Specifically, one of the source and the drain of the TFT1 connects to the first metal connecting line (ML(n+1)), the other one of the source and the drain connects to the first data line (DL(n+1)), one of the source and the drain of the TFT2 connects to the second metal connecting line (ML(n+2)), the other one of the source and the drain connects to the second data line (DL(n+2)), one of the source and the drain 3 of the TFT connects to the third metal connecting line (ML(n+3)), and the other one of the source and the drain connects to the third data line (DL(n+3)). In addition, the gates of the TFT1, the TFT2, the TFT3 electrically connect to the common conductive line (TP-SW).

The switch circuit may be arranged at a top side or a down side of the active area (AA).

The TFT may be a NMOS, PMOS, CMOS or a transmission gate.

The common conductive line (TP-SW) may be lead out by the touch sensing chip (IC).

In the display phase, the touch sensing chip (IC) provides signals for turning off the TFT, and the data line and the metal connecting lines (ML) are disconnected. In the touch phase, the touch sensing chip (IC) provides the signals for turning on the TFT, and the data line and the metal connecting layer (M3) are connected such that the resistance and the capacitance of the wirings in the active area (AA) of the touch panel may be greatly decreased. The RC loading is decreased, and the precision of the touch panel is enhanced.

In view of the above, a switch circuit including a set of TFT and a switch circuit of a common conductive line is configured in a rim of the active area (AA). In the touch phase, the touch sensing chip (IC) provides the signals to the common conductive line such that the TFT is turned on and the data line electrically connects to the metal connecting line. Thus, the resistance and the capacitance of the wirings in the active area (AA) of the touch panel may be greatly decreased. The RC loading is decreased, and the precision of the touch panel is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate of embedded touch panels, comprising:
   a touch electrode arranged in an active area of the touch panel in a matrix;
   a touch sensing chip arranged outside the active area of the touch panel;
   a plurality of metal connecting lines arranged on a different layer with the touch electrode, wherein the metal connecting lines are connected to the touch electrode via at least one through hole, and the metal connecting line and a data line of the touch panel are insulated from each other and are overlapped;
   wherein the touch electrode is connected to the touch sensing chip via the metal connecting line;
   wherein the switch circuit comprises at least one thin film transistor (TFT) and a common conductive line being arranged in a rim of the active area, a gate of the TFT is connected to the common conductive line, one of a source and a drain of the TFT is connected to the metal connecting line, and the other one of the source and the drain of the TFT is connected to the data line;

wherein the switch circuit is arranged between the metal connecting line and the data line, the switch circuit connects the metal connecting line and the data line in a touch phase, and the switch circuit disconnects the metal connecting line and the data line in a display phase.

2. The array substrate as claimed in claim 1, wherein the common conductive line is lead out by the touch sensing chip.

3. The array substrate as claimed in claim 1, wherein the TFT is a NMOS, a PMOS, a CMOS, or a transmission gate.

4. The array substrate as claimed in claim 1, wherein the switch circuit is arranged at a top side or a bottom side of the active area of the touch panel.

5. An embedded touch panel, comprising:
an array substrate comprising:
a touch electrode arranged in an active area of the touch panel in a matrix;
a touch sensing chip arranged outside the active area of the touch panel;
a plurality of metal connecting lines arranged on a different layer with the touch electrode, wherein the metal connecting lines are connected to the touch electrode via at least one through hole, and the metal connecting line and a data line of the touch panel are insulated from each other and are overlapped;

wherein the touch electrode is connected to the touch sensing chip via the metal connecting line;

wherein the switch circuit comprises at least one thin film transistor (TFT) and a common conductive line being arranged in a rim of the active area, a gate of the TFT is connected to the common conductive line, one of a source and a drain of the TFT is connected to the metal connecting line, and the other one of the source and the drain of the TFT is connected to the data line; and wherein the switch circuit is arranged between the metal connecting line and the data line, the switch circuit connects the metal connecting line and the data line in a touch phase, and the switch circuit disconnects the metal connecting line and the data line in a display phase.

6. The embedded touch panel as claimed in claim 5, wherein the common conductive line is lead out by the touch sensing chip.

7. The embedded touch panel as claimed in claim 5, wherein the switch circuit is arranged at a top side or a bottom side of the active area of the touch panel.

* * * * *